(12) United States Patent
Choksi et al.

(10) Patent No.: US 7,769,404 B1
(45) Date of Patent: Aug. 3, 2010

(54) GUARANTEED TALK PERMIT WITH FORCED AUDIO IN A DISPATCH COMMUNICATION NETWORK

(75) Inventors: Ojas Choksi, Farmers Branch, TX (US); Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 759 days.

(21) Appl. No.: 11/743,384

(22) Filed: May 2, 2007

(51) Int. Cl.
*H04B 7/00* (2006.01)

(52) U.S. Cl. .................... 455/518; 455/418; 455/552.1; 455/500; 370/296

(58) Field of Classification Search ................ 455/518, 455/418, 552.1, 500, 507, 519, 520; 370/296, 370/352
See application file for complete search history.

(56) References Cited

U.S. PATENT DOCUMENTS

| | | | | |
|---|---|---|---|---|
| 6,571,290 B2 * | 5/2003 | Selgas et al. | ................ | 709/228 |
| 6,640,109 B1 * | 10/2003 | Drozt et al. | ................ | 455/508 |
| 6,765,882 B2 * | 7/2004 | Rittle et al. | ................ | 370/277 |
| 6,904,285 B2 * | 6/2005 | Drozt et al. | ................ | 455/450 |
| 7,142,856 B2 * | 11/2006 | Barrow | ................ | 455/433 |
| 7,295,851 B2 * | 11/2007 | Liu et al. | ................ | 455/517 |
| 7,395,075 B2 * | 7/2008 | Posner et al. | ................ | 455/456.1 |
| 7,499,719 B2 * | 3/2009 | Rengaraju et al. | ................ | 455/518 |
| 7,555,304 B2 * | 6/2009 | Schwagmann et al. | ................ | 455/518 |
| 7,567,816 B2 * | 7/2009 | Hasegawa | ................ | 455/518 |
| 7,570,966 B2 * | 8/2009 | Zhao et al. | ................ | 455/519 |
| 7,636,581 B1 * | 12/2009 | Choksi et al. | ................ | 455/519 |
| 7,684,805 B2 * | 3/2010 | Zhao et al. | ................ | 455/448 |
| 2003/0002449 A1 * | 1/2003 | Rittle et al. | ................ | 370/277 |
| 2003/0087648 A1 * | 5/2003 | Mezhvinsky et al. | ................ | 455/456 |
| 2003/0236093 A1 * | 12/2003 | Drozt et al. | ................ | 455/450 |
| 2005/0075121 A1 * | 4/2005 | Hasegawa | ................ | 455/518 |
| 2005/0239486 A1 * | 10/2005 | D'Avello et al. | ................ | 455/519 |
| 2005/0261015 A1 * | 11/2005 | Schwagmann et al. | ................ | 455/518 |
| 2005/0287997 A1 * | 12/2005 | Fournier | ................ | 455/415 |
| 2006/0058025 A1 * | 3/2006 | Barrow | ................ | 455/433 |
| 2006/0079244 A1 * | 4/2006 | Posner et al. | ................ | 455/456.1 |
| 2006/0142037 A1 | 6/2006 | Sung et al. | | |
| 2006/0221890 A1 * | 10/2006 | Qian et al. | ................ | 370/328 |
| 2006/0229883 A1 * | 10/2006 | VanderBaan et al. | ................ | 704/277 |
| 2006/0293073 A1 * | 12/2006 | Rengaraju et al. | ................ | 455/518 |
| 2007/0254605 A1 * | 11/2007 | Zhao et al. | ................ | 455/90.2 |
| 2007/0281722 A1 * | 12/2007 | Gao | ................ | 455/518 |
| 2008/0004038 A1 * | 1/2008 | Dunko | ................ | 455/456.1 |
| 2008/0076403 A1 * | 3/2008 | Park et al. | ................ | 455/422.1 |

(Continued)

OTHER PUBLICATIONS

Push-to-Talk over Cellular Architecture V2.0.8 (Jun. 2004).

*Primary Examiner*—Minh D Dao

(57) ABSTRACT

Systems and methods for supporting dispatch communications with guaranteed talk permit and forced audio are provided. The systems and methods can include servers and communication units that operate according to the Push-to-Talk over Cellular (PoC) standard. A user of a communication unit can select a guaranteed talk permit with forced audio answer mode, and provide an indication of the answer mode to a PoC server. When the PoC server does not support a guaranteed talk permit with forced audio answer mode, this indication can be for a manual answer mode. Alternatively, the indication can be for a guaranteed talk permit with forced audio answer mode. In this case, a terminating communication unit is contacted during the dispatch communication setup even when the communication setup request is set to manual answer override.

23 Claims, 5 Drawing Sheets

U.S. PATENT DOCUMENTS

2008/0146207 A1 * 6/2008 Razdan ..................... 455/416
2009/0270049 A1 * 10/2009 Zhao et al. ................ 455/90.2
2009/0299941 A1 * 12/2009 McColgan et al. ............ 706/47
2010/0071027 A1 * 3/2010 Agulnik et al. ............... 726/1

* cited by examiner

GUARANTEED TALK PERMIT WITH FORCED AUDIO IN A DISPATCH COMMUNICATION NETWORK

BACKGROUND OF THE INVENTION

Wireless communication systems can provide a number of different voice communication services, including interconnect voice communication services and dispatch voice communication services. Interconnect voice communication services are those that are provided by most wireless communication systems, and are commonly considered as full-duplex, circuit-switched communications. Dispatch communication services are provided in only some wireless communication systems, and are commonly referred to as push-to-talk or walkie-talkie calls due to the half-duplex nature of the calls.

Dispatch communication services have typically been provided only in private wireless networks. For many years wireless networks based on the iDEN standard were the only publicly-accessible wireless networks that provided both dispatch and interconnect communication services. Recently wireless networks based on other wireless communication standards have incorporated dispatch communication services in addition to interconnect communication services. These newer dispatch communication services are based on, for example, Open Mobile Alliance (OMA) Push-to-Talk over Cellular (PoC) standards-based protocols.

One characteristic of the iDEN network is that it provides guaranteed talk permit and forced audio for dispatch communications. Guaranteed talk permit means that when a dispatch communication is setup the network verifies that the terminating communication unit is available (i.e., is registered with the network and radio frequency resources are available) and provides a confirmation tone to the originating communication unit. The user of the terminating communication unit is not typically involved in the call setup process. The originator of the communication can then send audio to the terminating communication unit, and this audio is automatically output without any action on the part of the user of the terminating communication unit. Hence the name forced audio.

The PoC standard provides three different call answering modes, auto answer, manual answer and manual answer override, none of which provide guaranteed talk permit with forced audio. FIG. 1 is a call flow diagram of an exemplary call setup procedure for a terminating communication unit set in auto answer mode in accordance with the PoC standard. The entire call setup procedure as defined by the PoC standard is illustrated in FIG. 1, however, only those portions relevant to understanding the present invention are presented here. For a more detailed discussion of the PoC standard the interested reader can refer to the document entitled Push-to-Talk over Cellular (PoC) Architecture V2.0.8 (2004-06), the entire disclosure of which is herein expressly incorporated by reference.

As illustrated in FIG. 1, when a terminating PoC server receives a session initiation protocol (SIP) INVITE message from an originating communication unit for a terminating communication unit set in auto answer mode (step 102), the terminating PoC server automatically responds with a SIP 200 OK message (step 104). This response is automatically generated without determining whether there are radio frequency (RF) resources available for the terminating communication unit. Auto answer is what is commonly referred to as optimistic talk permit, in that the terminating PoC server automatically indicates that the dispatch communication can proceed without determining whether the terminating communication unit can actually be provided with radio frequency resources. This can result in an originating communication unit sending audio to the terminating communication unit, only to find out that the communication was not actually setup due to, for example, the lack of radio frequency resources for the terminating communication unit, the terminating communication unit not being in a radio frequency coverage area of the network, or the terminating communication unit not being powered-on.

FIG. 2 is a call flow diagram of an exemplary call setup procedure for a terminating communication unit set in manual answer mode in accordance with the PoC standard. As with FIG. 1, the entire call setup procedure as defined by the PoC standard is illustrated in FIG. 2, however, only those portions relevant to understanding the present invention are presented here. As illustrated in FIG. 2, manual answer requires that the user of the terminating communication unit actually indicate that they wish to take the call by, for example, actuating a particular button on the communication unit (step 202). Although this provides guaranteed talk permit, it does not provide forced audio because the user of the terminating communication unit is aware that the call setup procedure is occurring and must affirmatively consent by, for example, actuating a button on the communication unit to actually participate in the communication.

Manual answer override is a calling mode set by an originating communication unit indicating that even if the terminating communication unit is set to manual answer, the terminating PoC server will respond to the originating PoC server that the terminating user is available, before the terminating PoC server has determined whether radio frequency resources are available to support the terminating communication unit Because the iDEN network was optimized to support both interconnect and dispatch communications, the network could provide a dispatch call setup with guaranteed talk permit and forced audio in less than one second. Networks designed in accordance with the PoC standard, however, are not optimized for dispatch communications, and accordingly various techniques are employed to provide a similar feel to the less than one second call setup time that is provided by the iDEN network. One of these techniques is the auto answer mode, which, as described above, indicates to the originating communication unit that the communication has been setup, even before making this actual determination. This provides the user of the originating communication unit with the feeling of a fast communication setup, but can greatly disappoint a user when the communication fails. In contrast, the manual answer answering mode provides guaranteed talk permit, but does not provide the fast communication setup provided by the iDEN network.

SUMMARY OF THE INVENTION

Exemplary embodiments provide systems and method for guaranteed talk permit with forced audio in a dispatch communication network that operates using the PoC standard. A communication unit can set a forced audio answer mode that provides guaranteed talk permit with forced audio. In accordance with one aspect of the present invention the dispatch communication unit indicates to a PoC server that the answer mode is set to manual answer. When a dispatch communication setup message is sent to the communication unit, the communication unit automatically responds, without requiring any action on the part of a user of the communication unit during the dispatch communication setup process. In accordance with another aspect of the present invention, the dispatch communication unit can indicate to the PoC server that the answer mode is a forced audio mode. Accordingly, even when a dispatch communication setup request indicates a manual answer override, the PoC server will still forward the call setup message to the communication unit to confirm that communication unit and radio frequency resources are available for the dispatch communication.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
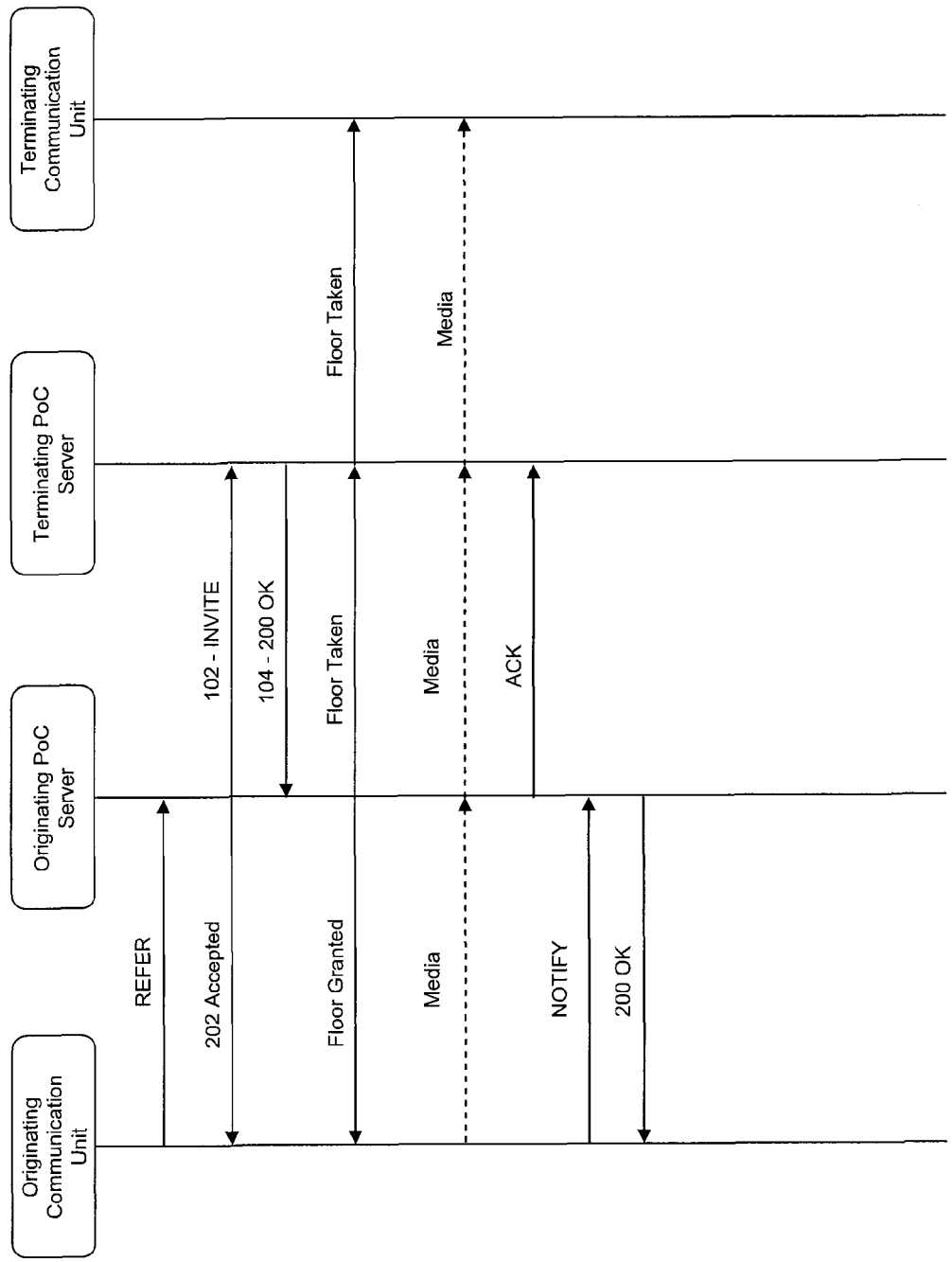
FIG. 1 is a call flow diagram of an exemplary call setup procedure for a terminating communication unit set in auto answer mode in accordance with the PoC standard.
Figure 2:
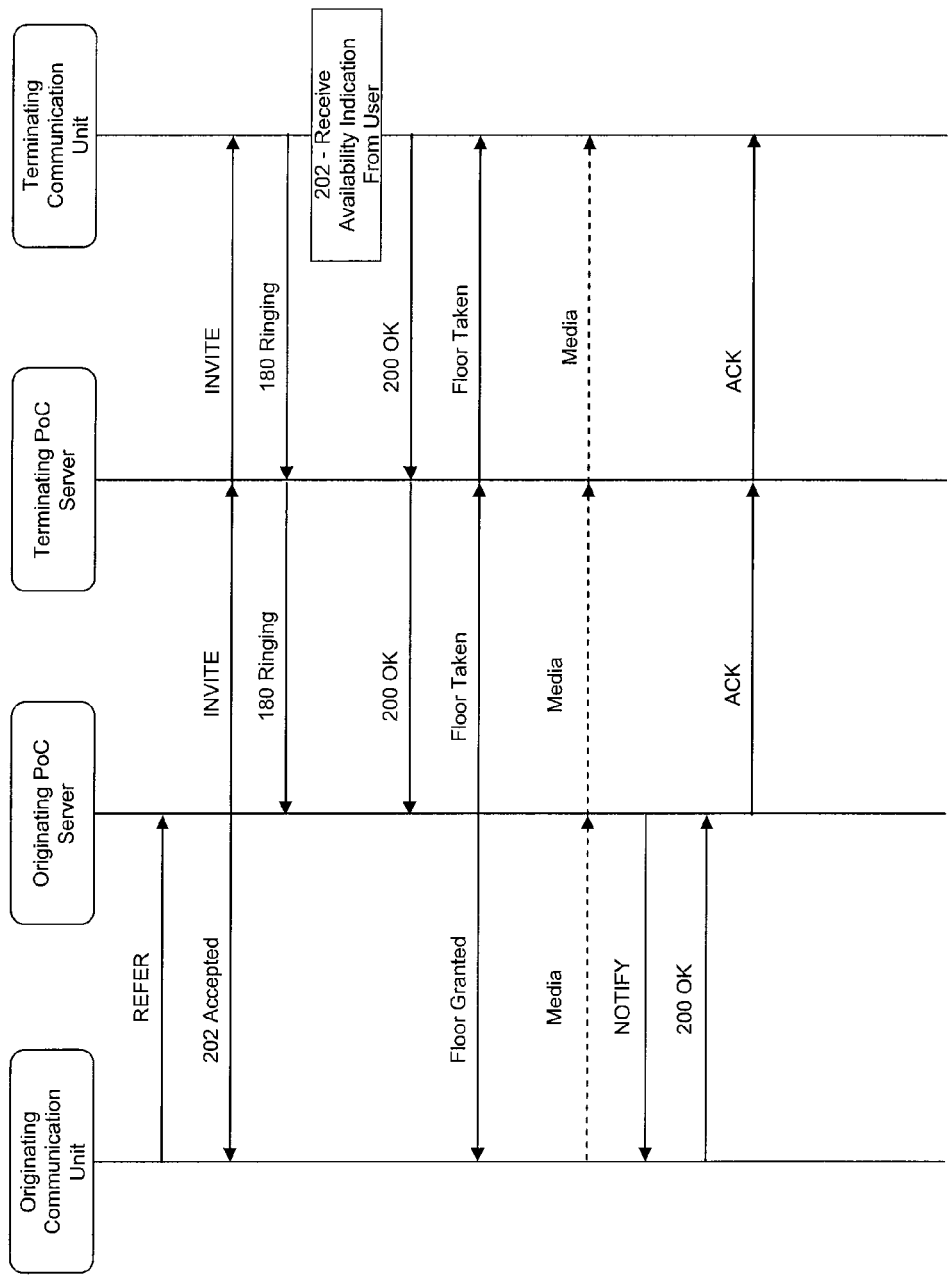
FIG. 2 is a call flow diagram of an exemplary call setup procedure for a terminating communication unit set in manual answer mode in accordance with the PoC standard.
Figure 3:
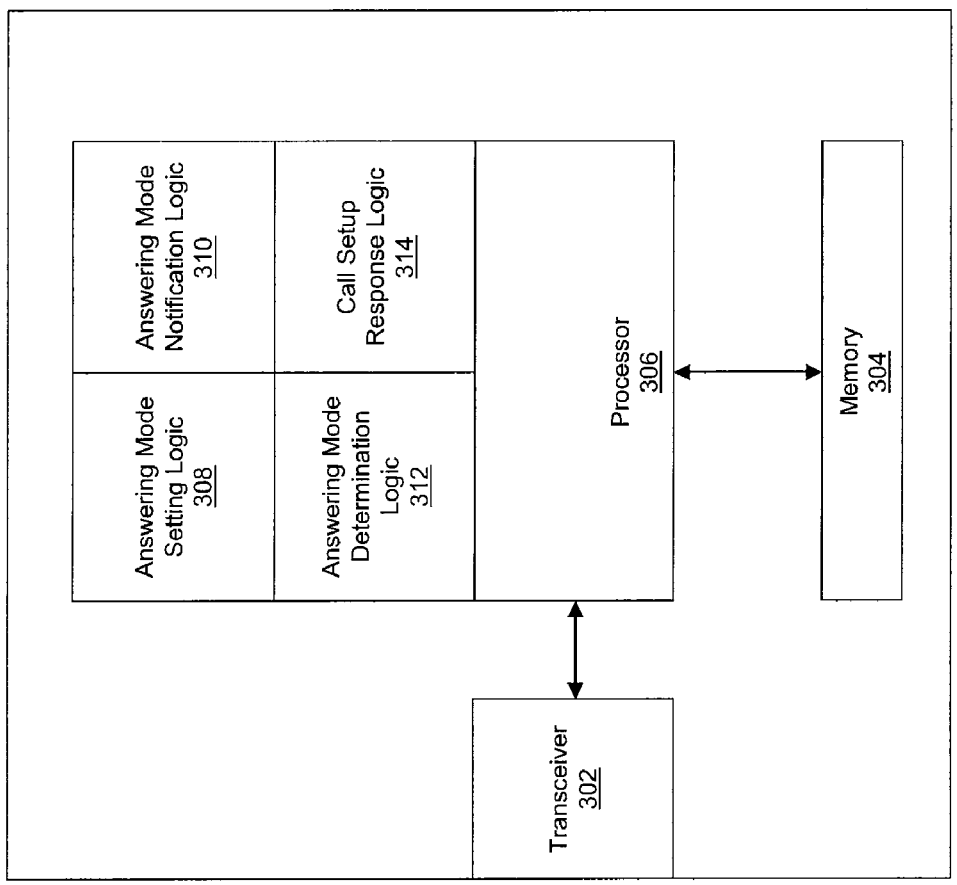
FIG. 3 is a block diagram of an exemplary communication unit in accordance with the present invention.

FIG. 3 is a block diagram of an exemplary communication unit in accordance with the present invention. The communication unit includes a transceiver 302 and memory 304 coupled to processor 306. Processor 306 includes logic 308-314, which will be described in more detail below in connection with FIGS. 4 and 5. Processor 306 can be any type of processor, such as a microprocessor, field programmable gate array (FPGA) and/or an application specific integrated circuit (ASIC). When processor 306 is a microprocessor then logic 308-314 can be processor-executable code loaded from memory 304.

Figure 4:
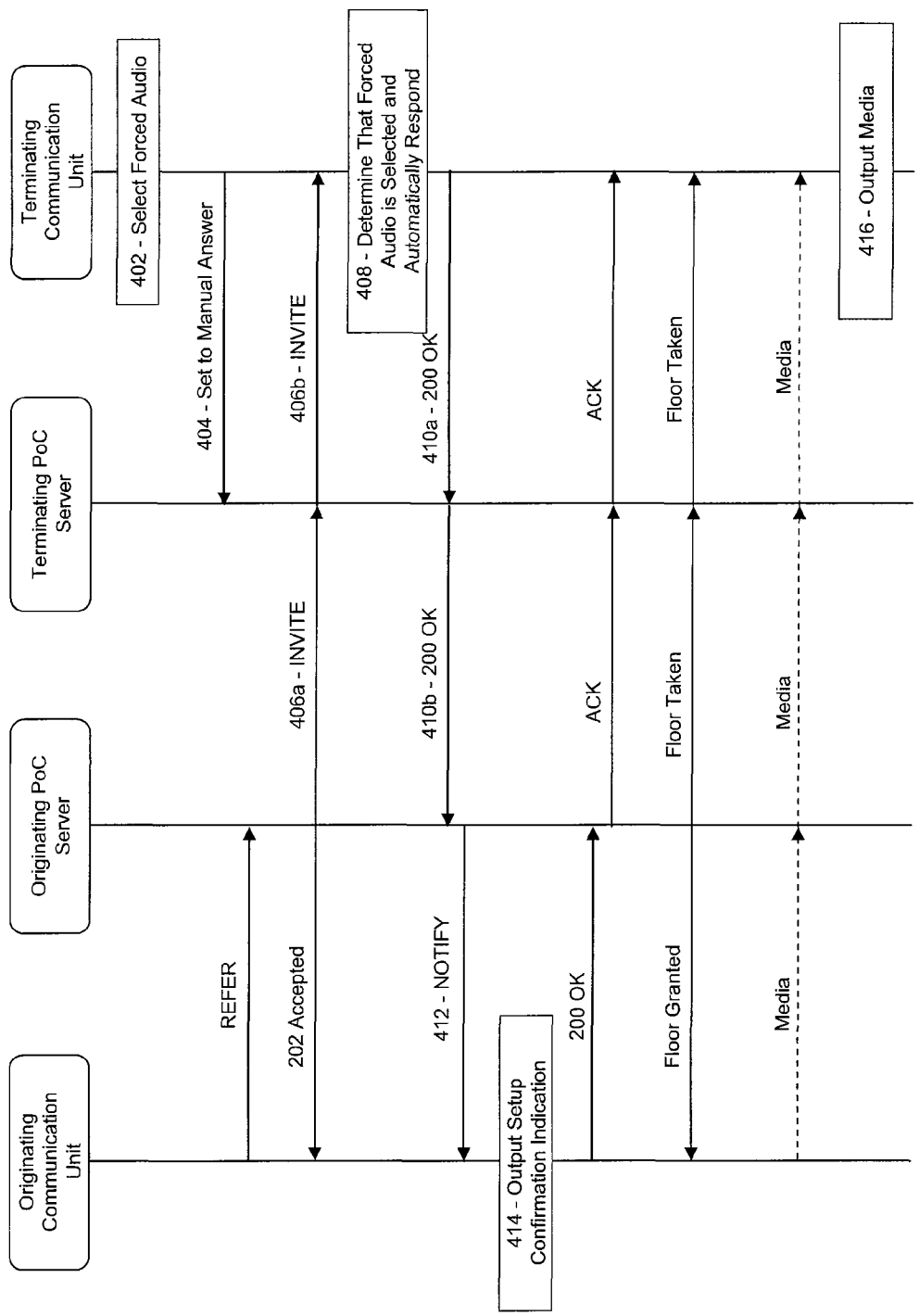
FIG. 4 is a call flow diagram of an exemplary call setup procedure in accordance with one aspect of the present invention.

FIG. 4 is a call flow diagram of an exemplary call setup procedure in accordance with one aspect of the present invention. Initially, a user of the terminating communication unit selects a forced audio answering mode and logic 308 sets the answering mode to the forced audio answering mode (step 402). In the PoC standard the answering mode is communicated via a new header field called the p-answer state in the signaling protocol, and can take values of either auto-answer (unconfirmed), manual answer (confirmed) or manual answer override. In accordance with this aspect of the present invention, the terminating PoC server does not support a forced audio answering mode. Accordingly, answering mode notification logic 310 of the terminating communication unit indicates to the terminating PoC server that the terminating communication unit is set to manual answer mode (step 404). When the terminating PoC server receives a SIP INVITE message (step 406a), the server establishes a radio frequency channel with the terminating communication unit and forwards the message (step 406b).

In response to receipt of the SIP INVITE message setting up a dispatch communication, logic 312 of the terminating communication unit determines that the answering mode is set to forced audio and logic 314 automatically responds (step 408) by sending a SIP 200 OK message (step 410a). The user of the terminating communication unit is not required to perform any action as part of the call setup procedure, in contrast to the conventional PoC manual answer mode that requires the user to accept the incoming dispatch communication.

The terminating PoC server forwards the SIP 200 OK message to the originating PoC server (step 410b), which then sends a SIP NOTIFY message to the originating communication unit (step 412). The originating communication unit then outputs a setup confirmation tone (step 414) indicating that the terminating communication unit is available and ready to receive media. After sending acknowledgement and receiving the floor grant message, the originating communication unit can provide media, which is automatically output by the terminating communication unit (step 416). Prior to receiving the media, the user of the terminating communication unit can be notified when the call setup process has been successfully completed.

Figure 5:
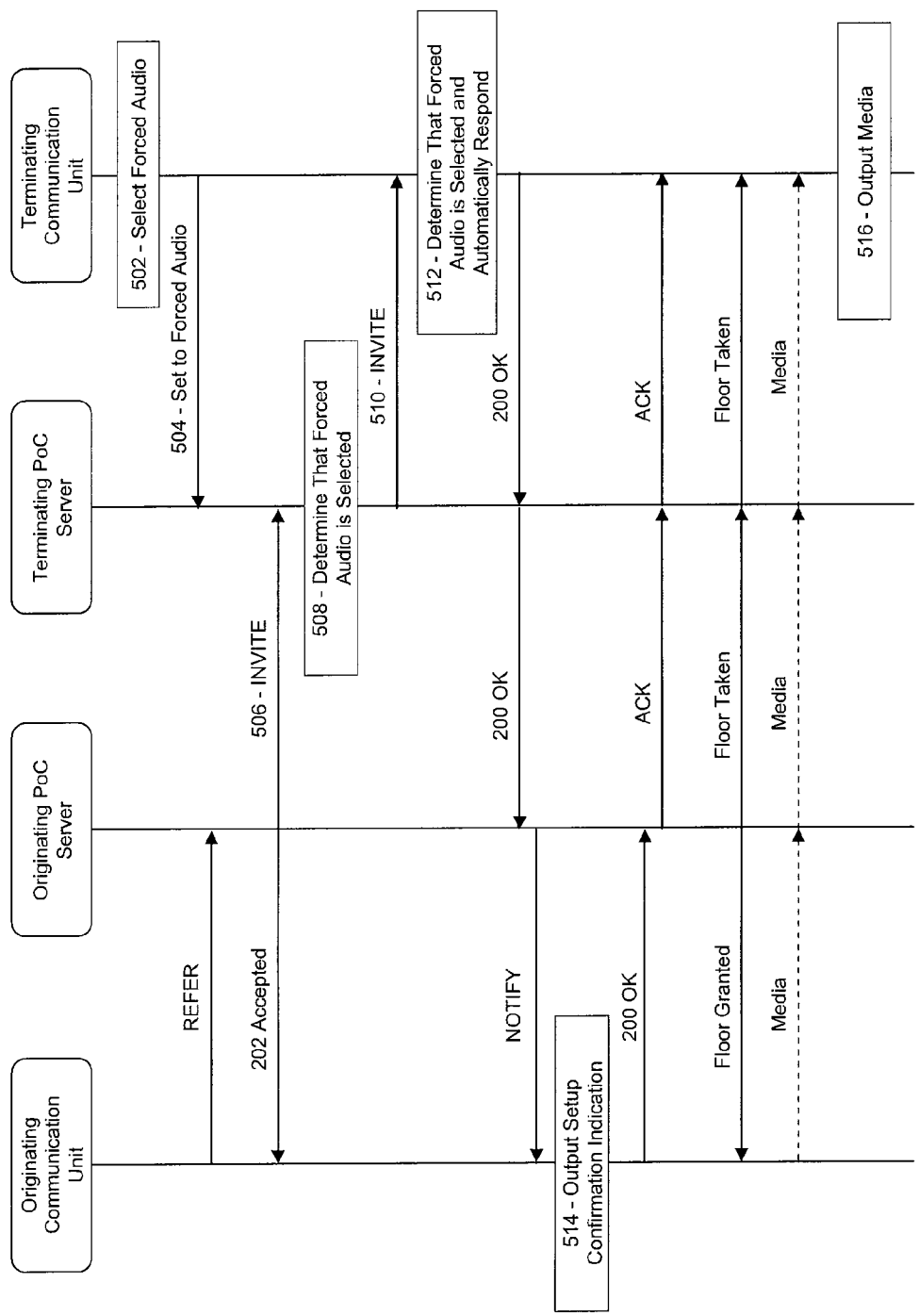
FIG. 5 is a call flow diagram of an exemplary call setup procedure in accordance with another aspect of the present invention.

FIG. 5 is a call flow diagram of an exemplary call setup procedure in accordance with another aspect of the present invention. The aspect of the system of FIG. 5 that differs from that of FIG. 4 is that the terminating PoC server recognizes the forced audio answering mode. Accordingly, in the call flow of FIG. 5, in response to the selection of the forced audio answering mode (step 502), logic 310 of the terminating communication unit sends an indication of the forced audio answering mode to the terminating PoC server (step 504). When the terminating PoC server receives a SIP INVITE message for the terminating communication unit (step 506), the terminating PoC server determines that a forced audio answering mode is selected (step 508) and forwards the message to the terminating communication unit (step 510). The terminating PoC server forwards this message even when the SIP INVITE message indicates that the originating communication unit has set the answering mode to manual answer override. In contrast, in conventional systems the terminating PoC server would not forward the SIP INVITE to the terminating communication unit when the manual answer override answer mode is set.

The remainder of the call flow of FIG. 5 operates in a similar manner to that described above in connection with FIG. 4, and a detailed description will not be repeated.

It should be recognized that certain terminology has been used for ease of description and should not be interpreted as limiting. For example, communication units and PoC servers have been denoted as originating or terminating in the exemplary call flows, however, an originating communication unit and PoC server can, for other dispatch communications, be a terminating communication unit and PoC server. Likewise, a terminating communication unit and PoC server can, for other dispatch communications, be an originating communication unit and PoC server.

Although not described above in connection with FIGS. 4 and 5, the terminating communication unit can determine whether the terminating PoC server supports guaranteed talk permit with forced audio, and based on that determination sends either the message of step 404 or 504. This determination can be performed by answering mode notification logic 310.

Although exemplary embodiments have been described in connection with particular messages being exchanged, such as SIP messages, the present invention is not so limited. Instead, any type of messages can be employed within the scope of the present invention. For example, sending the SIP INVITE message in steps 406b and 510 and the automatic response by the terminating communication unit can be replaced by any message and/or procedure for determining that the radio frequency resources for the terminating communication unit are available for the dispatch communication in the methods of FIGS. 4 and 5, in order to provide the guaranteed talk permit. Moreover, although the dispatch communication is setup using pre-established sessions in FIGS. 4 and 5, the present invention is equally applicable to all types of session setup procedures of the PoC standard.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for supporting a dispatch communications, the method comprising the acts of:
    receiving, by a terminating communication unit, a selection of a guaranteed talk permit with a forced audio answering mode for dispatch communications;
    providing a dispatch communication answering mode to a dispatch server;
    receiving a dispatch communication request; and
    automatically responding, by the terminating communication unit, to the dispatch communication request.

2. The method of claim 1, wherein the dispatch communication answering mode provided to the dispatch server is a manual answer answering mode.

3. The method of claim 1, wherein the dispatch communication answering mode provided to the dispatch server is the guaranteed talk permit with forced audio answering mode.

4. The method of claim 3, wherein when the dispatch communication request indicates a manual answer override mode, the dispatch server forwards the dispatch communication request to the terminating communication unit.

5. The method of claim 4, wherein the dispatch call request is a session initiation protocol (SIP) INVITE message.

6. The method of claim 5, wherein the response by the terminating communication unit is a SIP 200 OK message.

7. The method of claim 1, further comprising the act of:
    receiving audio by the terminating communication unit after automatically responding to the dispatch communication request.

8. The method of claim 1, further comprising the act of:
    outputting a notification that the dispatch communication is successfully setup.

9. The method of claim 1, further comprising the acts of:
    receiving, by an originating communication unit via one or more dispatch servers, the automatically generated response from the terminating communication unit;
    outputting, by the originating communication unit, an indication that a call setup procedure is successful; and
    receiving a floor grant message.

10. The method of claim 1, wherein dispatch communications are conducted in accordance with the Push-to-Talk over Cellular (PoC) standard.

11. A method for supporting a dispatch communications, the method comprising the acts of:
    receiving, by a terminating dispatch server, an answering mode selection of guaranteed talk permit with forced audio for a terminating communication unit;
    receiving a dispatch communication request; and
    providing the dispatch communication request to the terminating communication unit.

12. The method of claim 11, wherein the terminating dispatch server provides the dispatch communication request to the terminating communication unit independent of an answering mode indicated in the received dispatch communication request.

13. The method of claim 12, wherein the dispatch communication request indicates a manual answer override mode.

14. The method of claim 13, wherein the dispatch call request is a session initiation protocol (SIP) INVITE message.

15. The method of claim 14, wherein the response by the terminating communication unit is a SIP 200 OK message.

16. The method of claim 11, further comprising the acts of:
    receiving a response to the dispatch communication request from the terminating communication unit; and
    receiving audio by the terminating communication unit after receiving the response from the terminating communication unit.

17. The method of claim 11, further comprising the act of:
    outputting, by the terminating communication unit, a notification that the dispatch communication is successfully setup.

18. The method of claim 11, further comprising the acts of:
    receiving, by an originating communication unit via one or more dispatch servers, the response from the terminating communication unit;
    outputting, by the originating communication unit, an indication that a call setup procedure is successful; and
    receiving, by the originating communication unit, a floor grant message.

19. The method of claim 11, wherein dispatch communications are conducted in accordance with the Push-to-Talk over Cellular (PoC) standard.

20. A communication unit, comprising:
    a transceiver;
    a memory; and
    a processor coupled to the transceiver and memory, the processor comprising
        answering mode setting logic that receives a guaranteed talk permit with forced audio answering mode selection;
        answering mode notification logic that provides an indication of a dispatch communication answering mode to a dispatch server;
        answering mode determination logic that determines a set answering mode when a dispatch communication request is received; and
        call setup response logic that automatically responds to the dispatch communication request when the guaranteed talk permit with forced audio answering mode is selected.

21. The communication unit of claim 20, wherein the answering mode notification logic determines whether the dispatch server supports the guaranteed talk permit with forced audio answering mode, and selects the indication based on the determination.

22. The communication unit of claim 21, wherein the selected indication provided by the answering mode notification logic is a manual answer answering mode.

23. The communication unit of claim 21, wherein the selected indication provided by the answering mode notification logic is a guaranteed talk permit with forced audio answering mode.

* * * * *